United States Patent [19]

Rapoport et al.

[11] Patent Number: 5,321,711
[45] Date of Patent: Jun. 14, 1994

[54] SEGMENTED SOLID STATE LASER GAIN MEDIA WITH GRADIENT DOPING LEVEL

[75] Inventors: William R. Rapoport, Bridgewater; Michael L. Shand, Morristown, both of N.J.

[73] Assignee: AlliedSignal Inc., Morris Township, Morris County, N.J.

[21] Appl. No.: 930,256

[22] Filed: Aug. 17, 1992

[51] Int. Cl.$^5$ .............................................. H01S 3/16
[52] U.S. Cl. ......................................... 372/41; 372/20; 372/71
[58] Field of Search ........................ 372/20, 41, 69, 70, 372/71

[56] References Cited

U.S. PATENT DOCUMENTS

| | | | |
|---|---|---|---|
| 3,626,318 | 12/1971 | Young | 331/94.5 |
| 4,811,349 | 3/1989 | Payne et al. | 372/41 |
| 4,860,301 | 8/1989 | Nicholson | 372/68 |
| 5,007,065 | 5/1991 | Trutna, Jr. | 372/20 |
| 5,047,668 | 9/1991 | Bosenberg | 372/20 |
| 5,105,434 | 4/1992 | Krupke et al. | 372/69 |

FOREIGN PATENT DOCUMENTS 0454865  5/1991  European Pat. Off. ....... G02F 1/35

*Primary Examiner*—James W. Davie
*Attorney, Agent, or Firm*—Gerhard H. Fuchs

[57] ABSTRACT

Solid state laser gain media of segmented construction are composed of at least two segments of a doped crystalline laser host which are arranged in crystallographic alignment, wherein the dopant concentration varies from segment to segment to provide gradient doping levels for reducing thermally generated stress/strain in the lasing operation.

14 Claims, 2 Drawing Sheets

Segmented Crystals

SEGMENTED SOLID STATE LASER GAIN MEDIA WITH GRADIENT DOPING LEVEL

FIELD OF THE INVENTION

This invention relates to solid state laser gain media, more particularly to solid state laser gain media composed of segments having different doping levels.

BACKGROUND OF THE INVENTION

Pumping—especially longitudinal pumping with a single wavelength pump source—of uniformly doped laser hosts tends to cause non-uniform heating, leading to internal stress/strain within the host where the outer surfaces are cooled except for the end faces. Because of the exponential decay of the transmission function, the intensity I of a beam transversing a crystal is $$I = I_0 e^{(-\alpha l)}$$

where $I_0$ is the initial input, $\alpha$ is the absorption coefficient at a given pump wavelength and $l$ is the distance along the crystal. Absorbed energy translates into heat. Thus, much more energy (heat) is deposited at the entrance end of the host than further into the crystal. For example, in tests with 6.35 and 5 mm diameter uniformly doped $Cr^{+3}$:$LiSrAlF_6$ ("Cr:LiSAF") rods of approximately 6 cm length, the input end of the rods shattered at 15–18 Watts input levels when almost all of the pump energy was absorbed. Stress/strain calculations and thermal deposition profiles indicated large areas of stress/strain due to high thermal gradients due to exterior surface cooling except for the endfaces, and poor thermo-mechanical material properties. This can lead to catastrophic failure of the crystal without prior warning as the input power is increased. Longitudinal pumping of a uniformly doped host can also cause localized thermal augmentation due to Excited State Absorption (ESA) and upconversion processes, both of which are exacerbated by uneven pump energy absorption in accordance with the above-stated absorption formula. Further, the fluorescence lifetime in these crystals is strongly temperature dependent near room temperature, resulting in reduced stored energy in higher temperature areas and lower quantum efficiency, producing more localized heat.

SUMMARY OF THE INVENTION

We have found that the problems of unequal heat build-up in laser gain media can be ameliorated by providing a gradient doping level in the pumping direction within the laser gain medium, with the lower dopant concentration at the entrance end of the gain medium, followed by sections of increasing dopant concentration along the length of the gain medium, such that the input beam is gradually absorbed as it propagates toward the opposite exit end having the higher dopant concentration. In accordance with the present invention, this is accomplished by providing a laser gain medium, e.g. a rod or slab, composed of aligned segments having increasing dopant concentration from segment to segment, such that the dopant concentration increases in the direction of the pump energy input. Within each individual segment, the dopant concentration may be level, or it may vary within practical limits, the essence being that average dopant concentration changes from segment to segment provide for the desired gradient. The segments are in crystallographic alignment along the same crystal axis.

The segmented construction of laser gain media of the present invention in essence provides for stepwise approximation of a continuous dopant gradient profile. This is particularly advantageous for laser gain media composed of crystals which are difficult to grow with gradient dopant concentration, e.g. because of the dopant distribution factor between melt and crystal grown from the melt.

The invention is applicable to all solid state laser crystals, especially $Cr^{+3}$ doped laser crystals including alexandrite, and particularly to the family of tunable, chromium-doped fluoride crystal laser gain media of the composition $Cr^{+3}$:$XYZF_6$ wherein X is an alkali metal ion; Y is an alkaline earth metal ion, $Cd^{+2}$ or $Mg^{+2}$; and Z is $Al^{+3}$, $Ga^{+3}$ or $Sc^{+3}$. These include $Cr^{+3}$:$LiCaAlF_6$ ("Cr:LiCAF"), $Cr^{+3}$:$LiSrAlF_6$ ("Cr:LiSAF"), and $Cr^{+3}$:$LiSrGaF_6$ ("Cr:LiSGaF"). These crystals are somewhat frangible, and tend to fracture on unequal heating.

BRIEF DESCRIPTION OF THE DRAWINGS

In the annexed drawings.

DETAILED DESCRIPTION OF THE INVENTION OF THE PREFERRED EMBODIMENTS AND OF THE BEST MODE PRESENTLY CONTEMPLATED FOR ITS PRACTICE.

For an exemplary listing of solid state laser hosts suitable for constructing the segmented laser gain media of this invention, reference is made to Alexander A. Kaminskii, Laser Crystals, Springer Verlag, Berlin Heidelberg New York, 1981. Growth and fabrication into segments for use in the segmented laser gain media of this invention follows conventional procedures.

Figure 1:
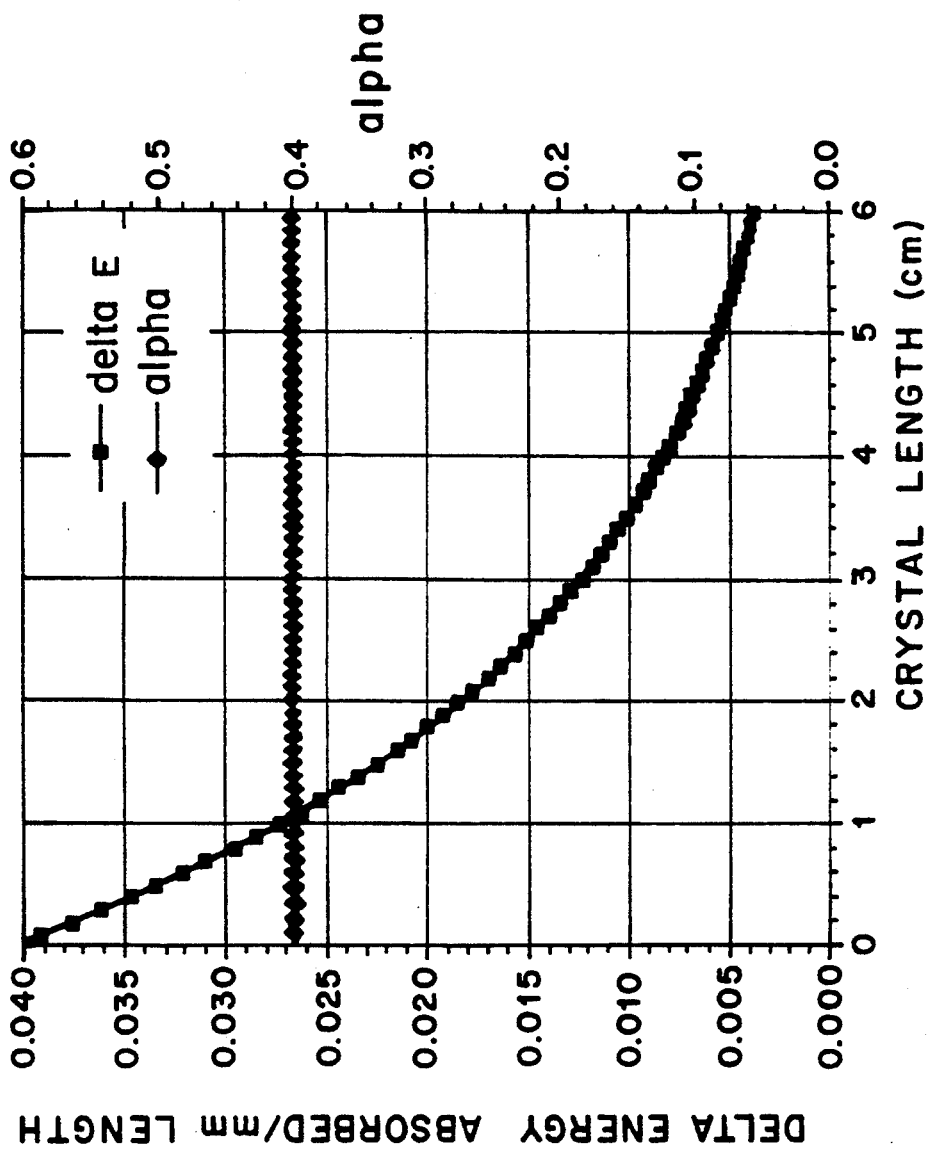
FIG. 1 energy absorption in a longitudinally pumped Cr:LiSAF rod of level $Cr^{+3}$ dopant concentration along the length of the rod.

FIG. 1 shows typical energy absorption condition for a longitudinally pumped, 6 cm long Cr:LiSAF crystal with 1.7 mole percent level $Cr^{+3}$ doping, with an absorption coefficient ($\alpha$) of $\approx 0.4$ at 746 nm. The term $\alpha$ is the absorption coefficient at a given wavelength and is related to the material by $\alpha = \sigma_a(\lambda) N$ where $\sigma_a(\lambda)$ is the absorption cross-section and N is number of $Cr^{+3}$ ions per $cm^3$. For Cr:LiSAF 100 mole % chromium doped material $N = 8.8 \times 10^{21}$ ions/$cm^3$. The figure plots the energy/0.1cc deposited down the length of the crystal, assuming a 1 Joule heat input at an area of 1 $cm^2$ at the entrance face. The bulk of the energy is deposited in the frontal portion of the crystal, causing large thermal gradients, which can lead to catastrophic failure of the crystal.

Figure 2:
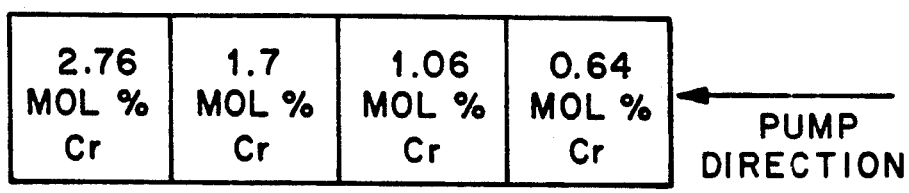
FIG. 2 shows construction of a laser gain medium of segmented construction composed of segments having increasing dopant level concentration from segment to segment.
Figure 3:
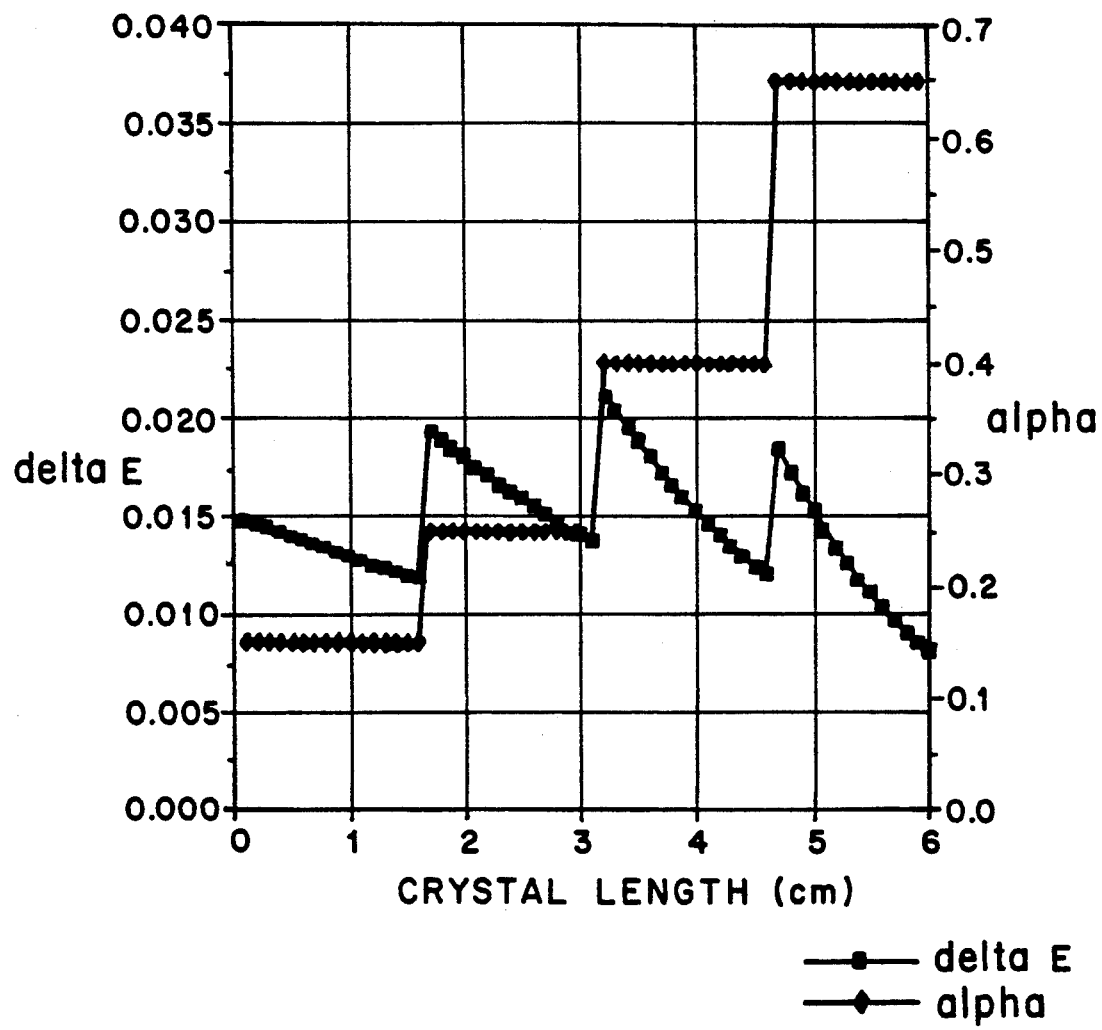
FIG. 3 illustrates energy absorption in a longitudinally pumped Cr:LiSAF laser gain medium (here a rod) of segmented construction of the type illustrated by FIG. 2.

FIG. 3 shows the energy absorption in the segmented laser gain medium illustrated by FIG. 2, which is composed of 4 segments, each having increasing dopant concentration in pump direction, as shown in FIG. 2. The total length of the segmented gain medium is the same as that of the single crystal unitary rod of FIG. 1. In the segmented gain medium the energy is deposited in more uniform manner overall, thereby reducing the thermal gradient to less than that obtained under the conditions illustrated in FIG. 1 at the same level of energy input. This would allow operation at higher pulse rate, or at higher input levels.

Provision of gradient chromium dopant level has additional benefits. Additional heating terms such as Excited State Absorption (ESA) and upconversion can result from the spectroscopic properties of the material. The fluorescence lifetime is temperature dependent, so that the quantum efficiency decreases with increasing temperature. Since the gradient doping level will tend to lower the maximum temperature overall by avoiding formation of high temperature zones towards the energy input side, overall quantum efficiency degrades less. The upconversion term is dependent on the excited state density squared, where heat is generated by neighboring excited states interacting to produce one Cr in the ground state and one in the excited state after decay back to the excited state. The Excited State Absorption (ESA) in the lasing wavelengths absorbs an input photon in the excited state instead of the ground state and generates heat in a non-radiative relaxation back to the excited state. All of these effects produce localized heat. Distributing the excited states density by tailoring the absorption profile will reduce the localized thermal load from these processes. The location of highest pumping density will have the greatest local ESA term. Reducing the excited state density will result in more uniform spread of ESA through the material, and a more uniform heat deposition term. It will not affect the gain term ($\sigma N^*$, where $\sigma$ is the emission cross-section and $N^*$ is the excited state ion density) since that term is a sum over the length. The same holds true for upconversion as a heat source.

Preferred embodiments of the invention are based on Cr:LiSAF, Cr:LiCAF, Cr:LiSGaF and alexandrite, with Cr:LiSAF and Cr:LiCAF being most preferred.

In the segmented laser gain media of the present invention, the individual segments are crystallographically aligned, and may be brought into direct, optical contact with each other, or they may be spaced apart. If spaced apart, the interfaces between the segments are preferably provided with an anti-reflection coating. Such coatings are conventional. Alternatively, an index-matching fluid may be interposed between the interfaces. Optical bonding or cementing may also be employed, to avoid or minimize Fresnel losses. The segmented laser gain media of this invention are composed of at least two segments, which may be of the same or of different size. There is no limit on the number of segments that may be employed, other than the practical limits imposed by the losses which are inevitably incurred at the interfaces. While the individual segments will ordinarily be of the same crystal material and merely differ in dopand concentration, it is possible to combine within the same lasing medium different crystalline materials having overlapping lasing wavelength, so as to meet particular requirements.

The segmented construction with gradient doping level as here disclosed solves many problems, and provides many advantages, as, for example:

the laser gain medium can be pumped at a greater level (higher pump energy and/or greater frequency) than is possible with a comparable uniformly doped host;

less uneven absorption profiles can be obtained, resulting in reduced stress/strain within the host;

the absorption profile can be tailored to meet desired absorption-dependent performance criteria;

additional heating terms due to Excited State Absorption, upconversion and thermally degraded quantum efficiency can be minimized;

it is a relatively inexpensive and straight-forward expedient for increasing power handling capability;

it permits the use of lower doped, hence less scatter loss material for a given length and absorption than may be present in a uniformly doped gain medium;

individual damaged segments can be replaced;

it allows use of shorter length crystals, which are more easily obtained, have lower scatter, and better wavefront quality;

it allows for rapid change of the doping profile by substitution of differently doped segments, so that the gain medium can be tailored to meet pumping conditions; as well as others.

We claim:

1. A solid state laser gain medium comprised of at least two segments of a doped crystalline laser host arranged in crystallographic alignment wherein the dopant concentration varies from segment to segment so as to provide a gradient dopant level in said gain medium.

2. The solid state laser gain medium of claim 1 wherein said crystalline laser host is $Cr^{+3}$ doped.

3. The solid state laser gain medium of claim 1 wherein said laser host is alexandrite.

4. The solid state laser gain medium of claim 1 wherein said laser host is a $Cr^{+3}$ doped crystal of the composition $XYZF_6$ wherein X is selected from $Li^+$, $Na^+$, $K^+$ and $Rb^+$; Y is selected from $Ca^{2+}$, $Sr^{2+}$, $Ba^{2+}$, $Cd^{2+}$ and $Mg^{2+}$; and Z is selected from $Al^{3+}$, $Ga^{3+}$ and $Sc^{3+}$.

5. The solid state laser gain medium of claim 4 wherein said laser host has the composition $Cr^{+3}$:LiSrAlF$_6$.

6. The solid state laser gain medium of claim 4 wherein said laser host has the composition $Cr^{+3}$:LiCaAlF$_6$.

7. The solid state laser gain medium of claim 4 wherein said laser host has the composition $Cr^{+3}$:LiSrGaF$_6$.

8. The solid state laser gain medium of claim 4 in the form of a laser rod.

9. The solid state laser gain medium of claim 4 in the form of a slab.

10. The solid state laser gain medium of claim 1 wherein the individual segments are in optical contact with each other.

11. The solid state laser gain medium of claim 10 wherein individual segments are joined by means of optical cement.

12. The solid state laser gain medium of claim 10 wherein individual segments are joined by means of an index matching fluid.

13. The solid state laser gain medium of claim 1 wherein individual segments are spaced apart and provided with an anti-reflection coating.

14. A solid state laser, comprising, in combination;
(a) a solid state laser gain medium comprised of at least two segments of a doped crystalline laser host arranged in crystallographic alignment wherein the dopant concentration varies from segment to segment so as to provide a gradient doping level in said gain medium;
(b) excitation means associated with said laser gain medium for pumping said laser gain medium;
(c) means for defining a resonant laser cavity surrounding said laser gain medium; and
(d) energy extraction means associated with said laser cavity for removing laser energy from said laser cavity;

wherein said excitation means are arranged such that the pump energy enters said laser gain medium at the side having lower dopant concentration and propagates along a path of increasing dopant concentration.

* * * * *